Patented Oct. 10, 1939

2,175,807

UNITED STATES PATENT OFFICE 2,175,807

SOLID DIAZONIUM SALTS

Ferdinand Keller, Offenbach-on-the-Main-Burgel, Germany, assignor to General Aniline Works, Inc., New York, N. Y., a corporation of Delaware No Drawing. Application January 31, 1939, Serial No. 253,805. In Germany February 1, 1938

4 Claims. (Cl. 260—142)

The present invention relates to new solid diazonium salts; more particularly it relates to cobaltous chloride double salts corresponding with the following general formula:

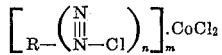

wherein $n$ and $m$ stand for one of the numbers 1 and 2, the sum of $n+m$ being always 3, and R stands for a radical of the benzine, naphthalene, diphenyl or anthraquinone series.

I have found that cobaltous chloride double salts of diazonium compounds can be obtained in a solid form by treating solutions of diazonium salts with cobaltous chloride or another cobalt salt in the presence of chlorine ions. The solid diazonium salts thus obtained are very stable and have a good solubility.

Diazonium double salts with cobaltous chloride have hitherto not been known. It is quite surprising that diazonium compounds can be separated by means of cobaltous chloride, since solid diazonium double salts cannot be obtained by means of the salts of nickel which is closely related to cobalt. The new cobaltous chloride double salts, when mixed with the usual diluents or adjuvants, may be worked up to valuable stable diazo-salts.

The following examples serve to illustrate the invention, but they are not intended to limit it thereto, the parts being by weight:

(1) 100 parts of 1-amino-3-chlorobenzene are slowly run, while stirring, into 381.7 parts of hydrochloric acid of 22.5 per cent strength. After cooling to —4° C. the solution is diazotised at 10° C. to 15° C. with 136.7 parts of a sodium nitrite solution of 40 per cent strength. After filtration of the diazo-solution, a solution of 96 parts of cobaltous chloride (CoCl$_2$.6H$_2$O) and 90 parts of water is added. The cobaltous chloride double salt of the following formula:

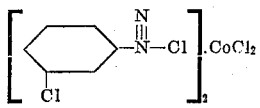

separates in the form of green crystals on addition of 500 parts of magnesium chloride; the crystals are filtered with suction and dried.

In the same manner the cobaltous chloride double salt of diazotised 1-amino-2.5-dichlorobenzene may be prepared.

(2) 125.8 parts of 1-amino-2-methyl-5-chlorobenzene hydrochloride are introduced into 386.9 parts of hydrochloric acid of 10 per cent strength and diazotised at 10° C. with 125.6 parts of a sodium nitrite solution of 40 per cent strength. The filtered diazo-solution is treated with a solution of 90 parts of cobaltous chloride

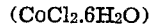

and 80 parts of water and salted out by means of 124 parts of sodium chloride. The cobaltous chloride diazo-salt separates in the form of green crystals which are filtered with suction and dried.

Instead of the sodium chloride magnesium chloride may be used.

(3) 200 parts of 1-amino-2-phenoxy-5-chlorobenzene are introduced into 591.3 parts of hydrochloric acid of 22.5 per cent strength. After formation of the hydrochloride, the whole is cooled to 0° C. and 74 parts of ice are added. The diazotisation is performed by running in 165 parts of a sodium nitrite solution of 40 per cent strength at 10° C. to 15° C. After filtration of the diazo-solution the cobaltous chloride double salt is separated by introducing a solution of 111.1 parts of cobaltous chloride (CoCl$_2$.6H$_2$O) in 100 parts of water. In order to separate the salt completely, 130 parts of sodium chloride are added. The green diazo-salt is filtered with suction and dried.

In a similar manner a cobaltous chloride double salt may be obtained from diazotised 1-amino-2-phenoxy-4-acetylamino-5-chlorobenzene or from diazotised 1-amino-2-(4'-chlorophenoxy)-5-ethoxycarbonyl-benzene.

(4) 100 parts of 1-amino-2(4'-chlorophenoxy)-5-chlorobenzene are introduced into 359.3 parts of hydrochloric acid of 20 per cent strength, then stirred for half an hour and diazotised with 71.3 parts of a sodium nitrite solution of 40 per cent strength. The diazo-solution obtained at 12° C. to 15° C. is filtered and precipitated with a solution of 49.2 parts of cobaltous chloride (CoCl$_2$.6H$_2$O) in 49.2 parts of water. The cobaltous chloride double salt separates in the form of green crystals. In order to complete the separation, 63 parts of sodium chloride are added. The precipitate is filtered with suction and dried.

(5) 100 parts of 1-amino-2-chloro-5-trifluoromethylbenzene are introduced into 467.3 parts of hydrochloric acid of 20 per cent strength and diazotised by running in at 0° C. to 12° C. 93 parts of a sodium nitrite solution of 40 per cent strength. After filtering the diazo-solution, a solution of 66 parts of cobaltous chloride (CoCl$_2$.6H$_2$O) and 50 parts of water is added and the product is salted out by means of 300 parts of magnesium chloride. The cobaltous chloride diazo-salt separates in the form of green crystals and is dried after filtering with suction.

(6) 121.7 parts of 1-amino-2-methoxy-5-nitrobenzene hydrochloride are introduced into 390 parts of hydrochloric acid of 11.2 per cent strength. The whole is diazotised by running in at 5° C. to 15° C. a solution of 105 parts of a sodium nitrite solution of 40 per cent strength and 103 parts of water. After filtering, a solution of 77.9 parts of cobaltous chloride ($CoCl_2.6H_2O$) in 70 parts of water is added and in order to separate the diazo-salt completely it is salted out with sodium chloride. The cobaltous chloride diazo-salt separates in the form of green crystals which are isolated and dried.

Instead of sodium chloride there may also be used magnesium chloride for salting out.

(7) 100 parts of 1-amino-2-methyl-5-nitrobenzene are well mixed with 48 parts of sodium nitrite and, for diazotisation, introduced at 10° C. to 15° C. into 480 parts of hydrochloric acid of 15 per cent strength. The diazo-solution thus obtained is mixed, after filtering, with a solution of 86 parts of cobaltous chloride ($CoCl_2.6H_2O$) in 70 parts of water and salted out by means of 300 parts of magnesium chloride. The cobaltous chloride diazo-salt which has separated in the form of green crystals is isolated and dried.

In a similar manner a cobaltous chloride double salt may be prepared from diazotised 1-amino-2-nitrobenzene.

(8) 200 parts of 1-amino-2-methoxy-5-diethyl-aminosulphonylbenzene are introduced into 849 parts of hydrochloric acid of 10 per cent strength. The whole is diazotised by running in at 0° C. to 5° C. 137.8 parts of a sodium nitrite solution of 40 per cent strength. To the filtered diazonium solution is added a solution of 95 parts of cobaltous chloride ($CoCl_2.6H_2O$) and 80 parts of water. The cobaltous chloride double salt separates, on addition of 1400 parts of magnesium chloride, in the form of green crystals. It is filtered with suction and dried.

In a similar manner a cobaltous chloride double salt may be prepared from diazotised 1-amino-2-methoxy-5-ethylsulphonyl-benzene.

(9) 100 parts of 2-aminodiphenylsulphone are introduced at 20° C. to 25° C. into 191 parts of nitrosylsulphuric acid containing 30 per cent of $HSO_5N$. Thereupon, the whole is stirred for 1 hour at 30° C. to 35° C. and then introduced into 500 parts of ice and 400 parts of water. After filtering the diazo-solution 70.6 parts of cobaltous sulphate ($CoSO_4.7H_2O$) and 300 parts of sodium chloride are added. The cobaltous chloride diazo-salt separates in the form of small light green crystals which are isolated and dried.

(10) 100 parts of 1-amino-4-benzoylamino-2-methoxy-5-methylbenzene are diazotised at 20° C. to 30° C. in 820 parts of hydrochloric acid of 4.6 per cent strength with 71 parts of a sodium nitrite solution of 40 per cent strength. After filtering the diazo-solution, a solution of 51 parts of cobaltous chloride ($CoCl_2.6H_2O$) and 45 parts of water is added. On addition of 200 parts of sodium chloride at 20° C. to 25° C. the green cobaltous chloride diazo salt separates which is filtered with suction and dried.

In a similar manner there may be obtained a cobaltous chloride double salt from diazotised 1-amino-4-(4'-methylphenoxyacetylamino)-2.5-dimethoxybenzene.

(11) 100 parts of 4-amino-2.3'-dimethylazobenzene are introduced into 1014 parts of hydrochloric acid of 4 per cent strength and diazotised at 0° C. to 8° C. with 201.2 parts of a sodium nitrite solution of 16 per cent strength. To the filtered diazo-solution 56.1 parts of cobaltous chloride ($CoCl_2.6H_2O$) and then 316 parts of sodium chloride are added. The cobaltous chloride double salt which has separated in the form of fine green crystals is filtered with suction and dried.

In a similar manner there may be prepared the cobaltous chloride double-salt of the diazonium chloride from 2-amino-4-methoxy-5-methyl-2'-chloro-4'-nitro-azobenzene, which is a dark yellow-brown crystalline powder of good stability and solubility.

(12) 100 parts of 4-amino-2.4'-dimethylazobenzene are introduced into 1014 parts of hydrochloric acid of 4 per cent strength and diazotised at 0° C. to 8° C. with 161 parts of a sodium nitrite soltuion of 20 per cent strength. 56.1 parts of cobaltous chloride ($CoCl_2.6H_2O$) and afterwards 310 parts of sodium chloride are added to the filtered diazo-solution. The cobaltous chloride double salt which has separated in the form of fine green crystals is filtered with suction and dried.

(13) 100 parts of 4.4'-diamino-3.3'-dimethoxy-diphenyl are introduced into 474 parts of hydrochloric acid of 15 per cent strength and tetrazotised at 0° C. to 15° C. by introducing 144 parts of a sodium nitrite solution of 40 per cent strength. After filtration of the tetrazo-solution, a solution of 107 parts of cobaltous chloride ($CoCl_2.6H_2O$) and 100 parts of water is added and the whole is salted out by means of 1000 parts of magnesium chloride. The cobaltous chloride tetrazo-salt separates in the form of small green crystals which are filtered with suction and dried.

In the same manner there may be obtained cobaltous chloride double salts of the tetrazo compounds from 4.4'-diamino-3.3'-dimethyl-diphenyl and 4.4'-diamino-diphenyl in the form of light-green crystalline powders.

(14) 18 parts of the diazonium chloride from 1-amino-anthraquinone containing 56.6 per cent of the base, molecular weight 223, which corresponds with 10 parts of 100 per cent, are dissolved at 20° C. to 22° C. in 300 parts of hydrochloric acid of 19 per cent strength. After filtration, a solution of 6 parts of cobaltous chloride ($CoCl_2.6H_2O$) and 6 parts of water is added. The cobaltous chloride diazo-salt separates in the form of green crystals which are dried after filtering with suction.

(15) 100 parts of the diazonium chloride from 4-amino-4'-methoxydiphenylamine are dissolved at 20° C. to 23° C. in 2464 parts of hydrochloric acid of 25 per cent strength. After filtration, a solution of 71.3 parts of cobaltous chloride ($CoCl_2.6H_2O$) and 71.3 parts of water is added. The cobaltous chloride diazo-salt separates partly and is salted out for complete separation with 300 parts of magnesium chloride. It is filtered with suction and dried.

(16) 100 parts of 5.8-dichloro-2-aminonaphthalene are introduced into a mixture of 288 parts of hydrochloric acid of 20° Bé. and 144 parts of water of 20° C., the whole is stirred for some time and then diazotised by running in a solution of 34 parts of sodium nitrite in 80 parts of water. After the solution has been filtered, 61.8 parts of cobaltous chloride
($CoCl_2.6H_2O$)
are introduced. On gradually cooling the cobaltous chloride diazo salt separates after a short time; it is completely salted out by means of 120 parts of sodium chloride. The product obtained is a crystalline, light-green powder having a good solubility.

In a similar manner a light-green cobaltous chloride diazo salt having the same good properties is obtained from 1-amino-5-nitronaphthalene.

The process may be carried out with other diazonium compounds in the same or a similar manner.

I claim:

1. The solid diazonium salts of the following general formula:

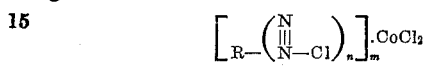

wherein $n$ and $m$ stand for one of the numbers 1 and 2, the sum of $n+m$ being always 3, and R stands for a member of the group consisting of radicals of the benzene, naphthalene, diphenyl and anthraquinone series, being generally green crystallised substances which are very stable and have a good solubility.

2. The solid diazonium salts of the following general formula:

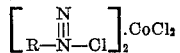

wherein R stands for a member of the group consisting of radicals of the benzene, naphthalene, diphenyl and anthraquinone series, being generally green crystallised substances which are very stable and have a good solubility.

3. The solid diazonium salt of the following formula:

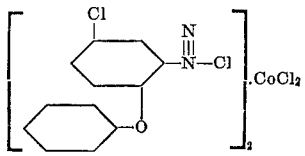

being green crystals which are very stable and have a good solubility.

4. The solid diazonium salt of the following formula:

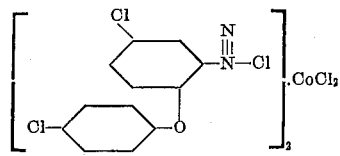

being green crystals which are very stable and have a good solubility.

FERDINAND KELLER.